United States Patent Office 3,464,929
Patented Sept. 2, 1969

3,464,929
HYDROCARBON CONVERSION CATALYST COMPRISING A HALOGEN COMPONENT COMBINED WITH A SUPPORT CONTAINING ALUMINA AND FINELY DIVIDED CRYSTALLINE ALUMINOSILICATE PARTICLES
Roy T. Mitsche, Island Lake, Ill., assignor to Universal Oil Products Company, Des Plaines, Ill., a corporation of Delaware
No Drawing. Continuation-in-part of application Ser. No. 517,845, Dec. 30, 1965. This application May 9, 1968, Ser. No. 728,070
Int. Cl. B01j 11/12, 11/44
U.S. Cl. 252—442      16 Claims

ABSTRACT OF THE DISCLOSURE

A novel hydrocarbon conversion catalyst, a method of manufacture thereof, and a process using the catalyst are disclosed. Catalyst comprises a halogen component combined with a support containing alumina and finely divided crystalline aluminosilicate particles. Key feature of this invention involves the preparation of the catalyst from an aluminum hydroxyl halide sol to which finely divided particles of crystalline aluminosilicate are added, thereby effecting some basic enhancement of the ability of the resultant catalyst to accelerate hydrocarbon conversion reactions that depend on carbonium ion intermediates: that is, the acidity level of the resultant composite is markedly increased. Principal utility of the resultant catalyst is in the area of acid catalyzed hydrocarbon conversion reactions such as cracking, alkylation, polymerization, etc. In addition, the catalyst can be combined with a Group VI or Group VIII metallic component and utilized to accelerate a wide variety of reactions of the type which have heretofore utilized dual-function catalysts such as hydrocracking, reforming, isomerization, etc.

CROSS-REFERENCES TO RELATED APPLICATIONS

This application is a continuation-in-part of my application Ser. No. 517,845, filed Dec. 30, 1965, and now abandoned.

DISCLOSURE

The subject of the present invention is a novel catalytic composite which has an exceptional activity when employed in hydrocarbon conversion processes that require a catalyst having a selective acid-function. More particularly, the present invention relates to a novel catalytic composite containing a halogen component combined with a support containing alumina and finely divided crystalline aluminosilicate particles. This catalyst is characterized by its method of preparation inasmuch as it is an essential feature of the present invention that the catalyst is formed by commingling finely divided crystalline aluminosilicate particles with an aluminum hydroxyl halide sol and the resulting mixture is thereafter transformed by conventional gelling and a calcination step into the catalyst of the present invention. The catalyst so produced finds utility in the acceleration of hydrocarbon conversion reactions that respond to acidic catalysts, and more particularly, when combined with a Group VI or Group VIII metallic component, in this hydrocarbon conversion reactions that traditionally have been improved by the use of dual-function catalysts.

Solid catalysts having a propensity to accelerate so-called acid-catalyzed reactions are widely used today in many industries within the petroleum and chemical arts to accelerate a wide spectrum of hydrocarbon conversion reactions. In many applications these catalysts are used by themselves to accelerate the reactions which mechanisticly are thought to proceed by carbonium ion intermediates such as catalytic cracking, alkylation, dealkylation, polymerization, etc. In other applications these acidic catalysts are combined with a hydrogenation-dehydrogenation metallic component to form a dual-function catalyst having both a cracking function and a hydrogenation-dehydrogenation function. In this latter case, the cracking function is generally thought to be associated with an acid-acting material of the porous, adsorptive, refractory oxide-type which is typically utilized as the support or carrier for a heavy metal component such as the metals or compounds of metals of Group VI or Group VIII of the Periodic Table to which the hydrogenation-dehydrogenation function is generally attributed.

Heretofore the acid or cracking function has been typically provided by a wide variety of materials such as alumina, silica-alumina, silica-magnesia, silica gels, phosphates, various types of amorphous clays, acid-treated alumina, halogen-containing alumina, and various other types of materials known to the art to exhibit so-called acidic sites on their surfaces. Recently, there has appeared a new variety of materials that are capable of providing this function which materials are generally characterized as crystalline aluminosilicates. It is not my purpose to add to the list of the materials available in either of these categories, but rather the thrust of the present invention is grounded in a finding of a synergistic combination of crystalline aluminosilicate, halogen and alumina. In other words, I have now found a method for combining crystalline aluminosilicates with an alumina material to produce a catalyst having an acidic function which is substantially greater than the sum of the acidity contributed by the halogen-containing alumina alone and the crystalline aluminosilicate alone.

More particularly, I have now found that by combining the crystalline aluminosilicate with an aluminum hydroxyl halide sol and then forming the resultant mixture into particles of any desired shape that these particles possess the ability to catalyze acid reactions which is sharply increased relative to that exhibited by a physical mixture of these components having exactly the same composition. In addition, I have observed that it is an essential requirement for the production of this synergistic effect that the sol utilized by an alumina hydroxyl halide sol and, more particularly, an aluminum hydroxyl chloride sol so that the resulting catalytic composite contains a halogen component.

The catalyst composite formed by the method of the present invention can be used with or without additional metallic components to accelerate a wide variety of hydrocarbon conversion reactions such as cracking, hydrocracking, isomerization, dehydrogenation, hydrogenation, desulfurization, cyclization, alkylation, polymerization, dealkylation, transalkylation, hydroisomerization, reforming for LPG, etc.

In one embodiment, accordingly, the present invention provides a method of preparing a hydrocarbon conversion catalyst comprising a halogen component combined with a support containing alumina and finely divided crystalline aluminosilicate particles. The method comprises the steps of: (a) commingling finely divided crystalline aluminosilicate particles with an aluminum hydroxyl halide sol to form a mixture thereof, (b) gelling the resultant mixture to obtain a hydrogel, and (c) calcining the resultant hydrogel to produce the catalyst.

In a second embodiment, the present invention relates to the catalyst produced by the method outlined in the first embodiment wherein a Group VI or Group VIII metallic component is combined therewith after the calcinnation step to produce a dual-function hydrocarbon conversion catalyst.

Another embodiment relates to a hydrocarbon conversion catalyst comprising about 0.01 to about 3 wt. percent of chlorine combined with a support containing alumina and finely divided crystalline aluminosilicate particles. The catalyst is characterized by its method of preparation which involves the following steps: (1) uniformly distributing finely divided crystalline aluminosilicate particles throughout an aluminium hydroxyl chloride sol to form a mixture thereof, (2) gelling the resultant mixture to form substantially spherical hydrogel particles, and (3) aging, washing, drying, and calcining the hydrogel particles to produce the catalyst.

Yet another embodiment relates to the catalyst described in the last embodiment wherein the crystalline aluminosilicate is mordenite and a Group VIII metallic component is combined therewith to obtain a dual-function catalyst having unusual capabilities to selectively crack hydrocarbons while simultaneously promoting dehydrogenation reaction, dehydrocyclization reactions, and hydroisomerization reactions.

Other objects and embodiments of the present invention relates to the details regarding the precise nature of the steps utilized in forming the catalyst, the nature of the catalytic components, the concentration of the components in the catalyst, the processes that the catalyst can be utilized in, and the like particulars which are hereinafter given in the following detailed discussion of each of these facets of the present invention.

As indicated above, the catalyst of the present invention comprises a halogen component combined with a support containing alumina and crystalline aluminosilicate particles. In addition, in some cases the catalyst may be combined with a sulfur component and/or metallic component selected from the metals and compounds from Group VI and VIII of the Periodic Table. Considering first the alumina utilized in the present invention it is preferred that the alumina be a porous, adsorptive, high surface area material having a surface area of about 25 to about 500 or more meter sq./gram. Suitable alumina materials are the crystalline aluminas known as gamma-, eta-, and theta- alumina with gamma-alumina giving best results.

It is an essential feature of the present invention that the alumina support contains finely divided crystalline aluminosilicate particles. As is well-known to those skilled in the art, crystalline aluminosilicates (also known as "zeolites" and "molecular sieves") are composed of a three-dimensional interconnecting network structure of silica and alumina tetrahedra. The tetrahedra are formed by four oxygen atoms surrounding a silicon or aluminum atom, and the basic linkage between the tetrahedra are through the oxygen atoms. These tetrahedra are arranged in an ordered structure to form interconnecting cavities or channels of uniform size interconnected by uniform openings or pores. The ion-exchange property of these materials follows from the trivalent nature of aluminum which causes the alumina tetrahedra to be negatively charged and allows the association of cations with them in order to maintain an electrical balance in the structure. The molecular sieve property of these materials follows from the uniform size of the pores thereof which pores can be related to the size of molecules and used to remove from a mixture of molecules, the molecules having a critical diameter less than or equal to the diameter of the pore mouths. For purposes of the present invention, it is preferred to use crystalline aluminosilicates having pore mouths of about 5 angstroms in cross-sectional diameter and more preferably about 5 to about 15 angstrom units. Ordinarily, the aluminosilicates are synthetically prepared in the alkali metal form with one alkali metal cation associated with each aluminum centered tetrahedra. This alkali metal cation may be thereafter ion-exchanged with polyvalent cations such as calcium, magnesium, beryllium, rare earth cations, etc. Another treatment of these alkali metal aluminosilicates involves ion-exchange with ammonium ions followed by thermal treatment, preferably above 300° F. to convert to the hydrogen form. When the crystalline aluminosilicate contains a high mole ratio of silica to alumina (for example, above 5) the material may be directly converted to an acid form in a suitable acid medium.

Although in some cases the polyvalent form of the aluminosilicate may be used in the present invention, it is preferred to use the hydrogen form or a form such as the alkali metal form, which is convertable to the hydrogen form during the course of the essential incorporation procedure discussed below.

The preferred crystalline aluminosilicate for use in the present invention are the hydrogen and/or polyvalent forms of synthetically prepared faujasite and mordenite. In fact, I have found best results with synthetic mordenite having an effective pore diameter of about 4 to about 6.6 angstrom units and a mole ratio of silica to alumina of about 9 to 11. As is well-known to those skilled in the art, mordenite differs from other known crystalline aluminosilicates in that is crystal structure is believed to be made up of chains of 5-member rings of tetrahedra which apparently are arranged to form a parallel system of channels having diameters of about 4 to 6.6 angstroms interconnected by smaller channels having a diameter of about 2.8 angstroms. Mordenite is characterized by the following formula:

$$0.9 \pm 0.2 M_{2/n}O : Al_2O_3 : X SiO_2 \text{ (anhydrous form)}$$

wherein M is a cation which balances the electrovalences of the tetrahedra, $n$ is the valence of M, and X is a constant generally ranging in value from 9 to 11 and usually about 10. These synthetic mordenite type zeolites are available from a number of sources, one being the Norton Company of Worchester, Mass.

Regarding the method of incorporating the crystalline aluminosilicate particles into the alumina support, it is an essential feature of the present invention that the crystalline aluminosilicate particles are added directly to an alumina hydroxyl halide sol prior to the sol being gelled. Although in some cases sols formed with fluorine, bromine, or iodine, may be satisfactory. I have found best results are obtained with an aluminum hydroxyl chloride sol formed by dissolving substantially pure aluminum metal in hydrochloric acid to result in a sol having a weight ratio of aluminum to chloride of about 1:1 to about 1.4:1. Additionally, it is preferred that the sol have a pH of about 3 to about 5. One advantage of this feature of the present invention is the relative ease with which the crystalline aluminosilicate particles can be uniformly distributed in the resulting catalyst. Additionally, the halogen present in the sol provides a halogen component in the resulting catalyst. However, the most important advantage is that the sol appears to react with the crystalline aluminosilicate, causing some basic modification of its structure which enables the resulting support to have unusual ability to catalyze reactions which depend on carbonium ion intermediates such as cracking alkylation, isomerization, polymerization, etc. and particularly hydrocracking to $C_3$ and $C_4$ fragments.

Accordingly, it is an essential feature of the present invention that the catalyst thereof is produced by the following steps: commingling finely divided crystalline aluminosilicate particles with an aluminum hydroxyl halide sol to form a mixture thereof; gelling the resultant mixture to produce a hydrogel or particles of ahydrogel; then finishing the hydrogel into the catalyst by standard aging, washing, drying and calcination treatments. For purposes of the present invention, the catalyst may be formed in any desired shape such as spheres, pellets, pills, cakes, extrudates, powders, granules, etc. However, a particularly preferred form of the catalyst is the sphere; and spheres may be continuously manufactured by the well-known oil drop method which comprises forming an alumina hydrosol, preferably by reacting aluminum metal with hydrochloric acid, combining the hydrosol with a suitable gelling agent such as hexamethylenetetraamine to form a dropping solution, uniformly distributing finely divided crystalline aluminosilicate particles throughout the dropping solution, and dropping the resultant mixture into an oil bath maintained at elevated temperatures. Alternatively, the particles may be commingled with the sol to form a mixture thereof and the gelling agent thereafter added to the mixture to form the dropping solution. In either case, the droplets of the mixture remain in the oil bath until they set and form substantially spherical hydrogel particles. The spheres are then continuously subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See U.S. Patent No. 2,620,314 for additional details regarding this oil drop method.

The amount of crystalline aluminosilicate in the resulting alumina support is preferably about 0.5 to about 20 wt. percent thereof, and, more particularly, when using mordenite about 2.0 to about 10.0 wt. percent. By the expression "finely divided" it is mant that the crystalline aluminosilicate is used in a particle size having an average diameter of about 1 to about 100 microns, with best results obtained with particles of average diameter of less than 40 microns.

An essential component of the catalyst of the present invention is the halogen component. Although the precise form of the chemistry of the association of the halogen component with the aluminum support is not entirely known, it is customary in the art to refer to the halogen component as being combined with the alumina support, or with the other ingredients of the catalyst. This combined halogen may be either fluorine, chlorine, iodine, bromine, or mixtures thereof. Of these, fluorine and particularly chlorine are preferred for the purposes of the present invention. As indicated above, a halogen component is inherently incorporated in the catalyst during preparation thereof. If desired, additional halogen may be added to the calcined catalyst as an aqueous solution of an acid such as hydrogel fluoride, hydrogen chloride, hydrogen bromide, etc. Moreover, an additional amount of the halogen component, may be composited with a catalyst during the impregnation of the latter with a metallic component; for example, through the utilization of a mixture of chloroplatinic acid and hydrogen chloride. In any event, the halogen component is combined with the support in amounts sufficient to result in a final catalyst which contains about 0.01 to about 3 wt. percent and preferably about 0.1 to about 1.0 wt. percent halogen calculated on an elemental basis.

In some cases, the catalyst produced by the method outlined above is conveniently combined with a metallic component selected from the metals or compounds of metals of Group VI and Group VIII of the Periodic Table to form a dual-function catalyst. The preferred metallic components comprise nickel, palladium, and platinum or a compound of platinum giving best results. The metallic component, such as platinum, may exist within the final catalytic composite as a compound such as an oxide, sulfide, halide, or in an elemental state. Generally, the amount of the metallic component present in the final catalyst is small compared to the other components combined therewith. In fact, when the metallic component is a platinum group component, it generally comprises about 0.05 to about 1.5 wt. percent of the final catalytic composite calculated on an elemental bases. In the case where the metallic component is a non-noble metal such as nickel, molybdenium, or tungsten, the preferred concentration is about 0.5 to about 40 wt. percent of the final dual-function catalyst calculated on an elemental metal basis.

The metallic component may be incorporated in the catalytic composite in any suitable manner such as ion-exchange and/or impregnation with a suitable solution of the metallic component. However, it is an essential feature of the present invention that the metallic component is combined with the catalyst prepared by the method of the present invention after the calcination step described above. Accordingly, the preferred method of preparing a dual-function catalyst comprising a metallic component combined with the catalyst prepared by the method outlined above involves the utilization of water soluble compounds of the metallic component to impregnate the calcined catalyst. For example, a platinum group metal may be added to the support by commingling the latter with an aqueous solution of chloroplatinic acid.

Regardless of the details of how the metallic component of the catalyst is combined with the catalyst, the resulting dual-function catalyst generally will be dried at a temperature of from about 200° F. to about 600° F. for a period of from about 2 to 24 hours or more and finally calcined at a temperature of about 700° F. to about 1100° F. for a period of about 0.5 to about 10 hours, and preferably about 1 to about 5 hours.

It is preferred that the resultant calcined dual-function catalytic composite be subjected to reduction conditions prior to its use in the conversion of hydrocarbons. This step is designed to insure a uniform and finely divided dispersion of the metallic component throughout the carrier material. Preferably, substantially pure and dry hydrogen is used as the reducing agent in this step. The reducing agent is contacted with the calcined catalyst at a temperature of about 800° F. to about 1200° F. and for a period of time of about 0.5 to 10 hours or more effective to substantially reduce platinum group component to its elemental state. This reduction treatment may be performed in s itu as part of a start-up sequence if desired.

Although it is not essential, the resulting reduced dual-funtion catalyst is preferably subjected to a presulfiding operation designed to incorporate in the catalytic composite from about 0.05 to about 0.50 wt. percent sulfur calcualted on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of the sulfur component, generally, including a temperature ranging from about 50° F. up to about 1100° F. or more.

According to the present invention, hydrocarbon is contacted with a catalyst of the type described above in a hydrocarbon conversion zone at hydrocarbon conversion conditions. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, the charge stock is preheated by any suitable heating means to the desired reaction temperature and then passed, into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or a vapor phase when they contact the catalyst with best results obtained in the vapor phase.

In the cases where the dual-function catalyst of the present invention is used in a reforming process or a process for the production of LPG and a high octane reformate, the conversion, system will comprise a conversion zone containing a fixed bed of the catalyst type previously characterized. This conversion zone may be one or more separate reactors with suitable heating means therebetween to compensate for the endothermic nature of the reactions that take place in each catalyst bed. The hydrocarbon feed stream that is charged to this conversion system in the reforming and LPG-production embodiments will comprise hydrocarbon fractions containing naphthenes and paraffins that boil within the gasoline range. The preferred charge stocks are those consisting essentially of naphthenes and paraffins, although in some cases aromatics and/or olefins may also be present. This preferred class includes straight run gasolines, natural gasolines, synthetic gasolines and the like. On the other hand, it is frequently advantageous to charge thermally or catalytically cracked gasolines or higher boiling fractions thereof, called heavy naphthas. In some cases, it is also advantageous to charge pure hydrocrabons or mixtures of hydrocarbons that have been extracted from hydrocarbon distillates—for example, straight-chain paraffins—which are to be converted to aromatics. It is preferred that these charge stocks be treated by conventional catalytic pretreatment methods to remove at least a portion of the sulfurous, nitrogenous and water-yielding contaminants therefrom.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins or a normal butane-rich stock, or a n-hexane-rich stock, etc. In hydrocracking embodiments, the charge stock will be typically a gas oil, heavy cracked cycle oil, etc. In addition, alkyl aromatics can be conveniently isomerized by using the catalyst of the present invention. Likewise, pure hydrocrabons or substantially pure hydrocrabons can be converted to more valuable products by using the catalyst of the present invention in any of the hydrocarbon conversion processes, known to the art, that use either an acidic catalyst or a dual-function catalyst.

In the reforming and LPG-production embodiments, an effluent stream is withdrawn from the conversion zone and passed through a condensing means to a separation zone, typically maintained at about 50° F. wherein a hydrogen-rich gas is separatied from a high octane liquid product, commonly designated as a reformate. Preferably, at least a portion of this hydrogen-rich gas is withdrawn from the separating zone and is then recycled through suitable compressing means back to the conversion zone. The liquid phase from the separating zone is then typically withdrawn and commonly treated in a fractionating system in order to recover LPG (i.e. liquified petroleum gas) and other light ends and to produce a high octane reformate.

The conditions utilized in the numerous hydrocarbon conversion embodiments of the present invention are those customarily used in the art for the particular reaction, or combination of reactions, that is to be effected. For instance, alkylaromatic isomerization conditions include: a temperature of about 32° F. to about 1000° F. a pressure at atmospheric to about 1500 p.s.i.g.; hydrogen to hydrocarbon mole ratio of about 0.5:1 to about 20:1, and a LHSV (calculated on the basis of equivalent liquid volume of the charge stock contacted with the catalyst per hour divided by the volume of conversion zone containing catalyst) of about 0.5 hr.$^{-1}$ to 20 hr.$^{-1}$. Typical alkylation conditions comprise: a temperature of about 32° F. to 800° F. a pressure of about atmospheric to about 2000 p.s.i.g., a LHSV of about 1 to 20 hr.$^{-1}$. Likewise, typical hydrocracking conditions include: a pressure of about 400° p.s.i.g. to about 3000 p.s.i.g.; a temperature of about 400° F. to about 900° F.; a LHSV of about 0.1 hr.$^{-1}$ to about 10 hr.$^{-1}$; and hydrogen circulation rates of 1000 to 10,000 s.c.f. per barrel of charge.

Conditions utilized in the embodiment of the present invention when substantial quantities of LPG and a high octane reformate are to be produced include: a pressure of about 400 to about 600 p.s.i.g., a temperature of about 800 to about 1050° F. a LHSV of about 0.5 to 5.0 hr.$^{-1}$ and a hydrogen to hydrocarbon mole ratio of about 5:1 to 15:1.

The following examples are given to illustrate further the preparation of the catalytic composite of the present invention and the use thereof in the conversion of hydrocarbons. It is understood that the examples are given for the sole purpose of illustration and are not to be considered to limit unduly the generally broad scope and spirit of the appended claims.

Example I

Aluminum metal, having a purity of 99.99 wt. percent is digested in hydrocholoric acid to produce an aluminum hydroxyl chloride sol having a weight ratio of Al/Cl of about 1.15 and a specific gravity of 1.3450. An aqueous solution containing 28 wt. percent HMT (i.e. hexamethylene tetraamine), is made up and 700 cc. of the HMT solution is added to 700 cc. of the sol and thoroughly mixed to form a dropping solution. About 10 grams of the hydrogen form of synthetic mordenite obtained from the Norton Company in the form of a fine powder is commingled with the dropping solution and uniformly dispersed therein. Another portion of the synthetic mordenite is analyzed for particle size distribution which show that 57.6 wt. percent of the powder is between 0 and 20 microns in size, 69.5 wt. percent of the powder is between 0 and 40 microns in size and 82.1 wt. percent of the powder is between 0 and 60 microns in size.

The dropping solution containing the dispersed synthetic mordenite is passed through a vibrating dropping head and dropped in discrete spherical particles into a forming oil maintained at 95° C. The rate of vibration and the volumetric flow of dropping solution are controlled to produce finished spherical particles of about 1/16 of an inch in diameter. The dropped hydrogel spheres are aged in oil overnight (about 16 hours), separated from the oil and aged in an ammonia solution at 950 C. for about 3 hours. The aged spherical particles are then water washed to remove neutralization salts and dried. The particles are thereupon calcined at 600° C. for 4 hours in dry air to give a catalyst support having an apparent bulk density of about 0.52 gm./cc., a surface area of about 200 m.$^2$gm., a pore volume of about 0.54 ml./gm. and an average pore diameter of about 105 angstroms. The resulting particles contain 5 wt. percent mordenite and about 0.2 wt. percent chloride and are called herein Batch 1.

Another batch of particles are prepared in the same manner as above except the sodium form of mordenite is used instead of the hydrogen form. These are called Batch 2 and contain 5 wt. percent mordenite and about 0.2 wt. percent chloride.

Another batch called Batch 3 is prepared in the same manner as Batch 1 except the mordenite concentration is reduced to produce spheres containing about 2 wt. percent mordenite.

Still another batch called Batch 4 is prepared as Batch 1 but containing 10 wt. percent mordenite.

A further batch, called Batch 7, is prepared by physically mixing dry synthetic mordenite (in the hydrogen form) with dry alumina containing chloride to result in a mxture containing 5 wt. percent mordenite and 0.2 wt. percent chloride.

One gram of each of the above batches, one gram of the hydrogen form of pure mordenite (called Batch 5) and one gram of alumina containing 0.2 wt. percent chloride without any mordenite (called Batch 6) are pretreated by outgassing at 600° C. for one-half hour. After outgassing, the samples were subjected to ammonia gas at one atmosphere for 10 minutes, then outgassed at 40° C. for one-half hour. The ammonia remaining in the sample was analyzed by oxidation with a 2% oxygen in helium blend. The acidities of each of the batches is determined as the amount of oxygen needed to oxidize the irreversibly adsorbed ammonia. This procedure was repeated on all the batches of new 1 gram samples using an ammonia outgassing temperature of 500° C. The results of these tests are tabulated in Table 1 below.

TABLE I

| Batch | 1 | 2 | 3 | 4 | 5 | 6 | 7 |
|---|---|---|---|---|---|---|---|
| Acidity at 400° C | 135 | 135 | 78 | 141 | 190 | 30 | 46 |
| Acidity at 500° C | 60 | 60 | 42 | 66 | 130 | 28 | 3 |
| Concentration of mordenite | 5 | 5 | 2 | 10 | 100 | 0 | |

The acidity numbers are arbitrary numbers only to be employed to show relative acid strengths of these various batches. It should be noted for example by comparing the 400° C. acidities of the Batch 1 and the Batch 7 samples, the technique of incorporating 5 wt. percent mordenite in the alumina by the method of this invention results in an increase in acid strength of about 194% over that by merely physically mixing the mordenite and the alumina. This data clearly shows the synergistic properties of the composition of this invention.

Example II

The catalyst designated Batch 1 in Example I is utilized in an isomerization reaction, 50 cc. of the finished catalyst being placed in an appropriate continuous isomerization apparatus and isopropylbenzene being employed as the charge stock. The reactor maintained at about 300 p.s.i.g., about 480° C. and a hydrogen to hydrocarbon mole ratio of about 8:1. Substantial conversion of the isopropylbenzene to trimethylbenzene is obtained.

Another 25 cc. of the catalyst designated Batch 1 in Example I is utilized in another run using the isomerization apparatus and ortho-xylene as the charge stock. The reactor is maintained at about 300 p.s.i.g., about 460° C. and a hydrogen to hydrocarbon mole ratio of about 8:1 and sufficient charge stock is introduced to maintain a LHSV of about 4.0. Conversion of ortho-xylene to para-xylene is obtained.

Example III

About 350 cc. of the catalyst designated Batch 1 above, in the form of spherical particles, is placed in a steam jacketed rotating vessel and 250 cc. of an impregnation solution containing chloroplatinic acid and HCl is added thereto. The impregnation solution contains 131.2 cc. of 10 milligram per milliliter of platinum and 8.4 cc. of concentrated HCl. The vessel is rotated until all the liquid solution is evaporated. The particles are then oxidized to produce a finished catalyst containing about 0.75 wt. percent platinum, about 0.75 wt. percent chloride and about 5 wt. percent synthetic mordenite.

Example IV

The catalyst of Example III is utilized in an alkylation reaction to determine its alkylation activity. In this example, 100 grams of this catalyst is placed in an appropriate alkylation apparatus which is provided with heating means. In the experiment, benzene and ethylene are charged separately to the alkylation reaction zone. The reactor is maintained at about 500 p.s.i.g. and 150° C. Substantially complete conversion of the ethylene is obtained. The product is analyzed for olefins by mass spectrometer and it is found that the product comprises ethylbenzene, diethylbenzene, polyethylbenzenes and unreacted benzene.

Example V

The catalyst of Example III is utilized in a polymerization reaction zone to determine the polymerization activity of said catalyst. In this experiment, 100 grams of the catalyst are placed in the reaction zone which is provided with heating means. A 1:1 molar propane-propylene mixture is charged to the polymerization reactor. The reactor is maintained at about 1000 p.s.i.g. and about 140° C. Based on weight, about 85% olefin conversion is obtained. The liquid product is analyzed and it is found that the product comprises about 70% propylene trimer, 20% propylene tetramer, and 10% intermediate and higher cuts.

Example VI

The catalyst of Example III is utilized in an isomerization reaction, 50 cc. of said catalyst being placed in an appropriate continuous isomerization apparatus. In the experiment, normal butane is charged to the isomerization zone. The reactor is maintained at about 800 p.s.i.g. and 140° C. Substantial conversion of the normal butane to isobutane is obtained.

Example VII

The catalyst of Example III is utilized in the continuous isomerization apparatus, 50 cc. of said catalyst being placed in the isomerization reactor and 1-pentene being employed as the charge stock. The reactor is maintained at about 1000 p.s.i.g. and about 180° C. Substantial conversion of the 1-pentene to 2-pentene is obtained.

Example VIII

About 350 cc. of the catalyst designated Batch 1 in Example I is placed in a steam jacketed rotating vessel and 250 cc. of an impregnation solution containing chloroplatinic acid, and hydrochloric acid is added thereto. The vessel is rotated until all the liquid solution is evaporated. The catalyst particles are then oxidized at a temperature of about 1025° F. to produce a finished catalyst containing, on an elemental basis, 0.75 wt. percent platinum and about 0.87 wt. percent chloride.

The resulting catalytic composite is thereafter reduced with a substantially pure hydrogen stream at a temperature of about 1020° F., a gas hourly space velocity of about 700 hr.$^{-1}$ and a pressure slightly above atmospheric for a period of about 1 hour. A gaseous mixture of $H_2S$ and $H_2$ is then utilized to incorporate sulfur in the resulting reduced composite. The gaseous mixture contains about 10 moles of $H_2$ per mole of $H_2S$, and is contacted with the catalyst at essentially the same conditions as those given above for the reduction step resulting in the incorporation of about 0.10 wt. percent sulfur in the catalyst.

An analysis of the resulting catalytic composite shows it to contain 0.75 wt. percent platinum, 0.87 wt. percent chloride, 0.01 wt. percent sulfur, and about 4.4 wt. percent $SiO_2$.

Example IX

This example demonstrates the capability of the catalyst of Example VIII to produce extraordinary quantities of LPG.

A portion of the catalyst prepared in Example VIII is designated as Catalyst A.

Another catalyst is manufactured in essentially the same manner as outlined in Example VIII except that no crystalline aluminosilicate is added to the carrier material. The resulting catalyst is designated as Catalyst B and is found to contain 0.75 wt. percent platinum, 0.85 wt. percent chloride and 0.10 wt. percent sulfur. It is representative to the high quality reforming catalyst of the prior art, and is used herein as the control.

Catalysts A and B are then separately subjected to a high evaluation test which consists of charging a heavy naphtha having the properties shown in Table I to a continuous reforming plant containing the catalyst as a fixed bed at conditions including a LHSV of 2.0 hr.$^{-1}$, a hydrogen to hydrocarbon mole ratio of 12:1, a pressure of 500 p.s.i.g., a temperature of 959° F., and for a period of 14 hours.

TABLE I.—PROPERTIES OF HEAVY NAPHTHA

| | |
|---|---|
| API° gravity at 60° F. | 60.3 |
| ASTM distillation D86: | |
| IBP, °F. | 250 |
| 10%, °F. | 265 |
| 50%, °F. | 285 |
| 90%, °F. | 336 |
| EBP, °F. | 395 |
| Sulfur, p.p.m. | 113 |
| Oxygen, p.p.m. | 100 |
| Aromatics, vol. percent | 1 |
| Naphthenes, vol. percent | 13 |
| Parraffins, vol. percent | 86 |

The results of these comparison tests are shown in Table II in terms of average product distribution over the 14 hour test period.

TABLE II.—RESULTS OF COMPARISON TESTS

| | Catalyst A | Catalyst B | Increment |
|---|---|---|---|
| Octane No., F-1 clear | 96.9 | 96.9 | 0 |
| Excess recycle gas, s.c.f.b. | 146.9 | 956 | −808 |
| Mol percent $H_2$ in recycle gas | 56.4 | 73.6 | −17.2 |
| Product distribution: | | | |
| $H_2$, wt. percent of feed | .23 | 1.61 | −1.31 |
| $C_1$, wt. percent of feed | 1.86 | 2.61 | −.75 |
| $C_2$, wt. percent of feed | 4.95 | 4.87 | +.08 |
| $C_3$, wt. percent of feed | 16.82 | 9.26 | +7.56 |
| $C_4$, wt. percent of feed | 22.96 | 11.50 | +11.46 |
| $C_5+$, wt. percent of feed | 55.06 | 71.58 | −16.52 |

From Table II, the effect of the catalyst of Example VIII on the performance of the reforming process is immediately evident. It results in a dramatic shift in the light gas make toward $C_3+C_4$ production (LPG) with no corresponding increase in $C_1+C_2$ make. More particularly, the selectivity for LPG for Catalyst A is 39.78 wt. percent of the charge stock whereas for Catalyst B the selectivity for LPG is 20.76 wt. percent of the charge. Accordingly, the catalyst of the present invention enables the LPG yield to be sharply increased with no corresponding increase in undesired $C_1+C_2$ make.

Example X

A long-term comparison test is made between the catalyst of the present invention and an ordinary reforming catalyst operated at process conditions designed to promote LPG production.

The charge stock utilized is a Kuwait naphtha having a gravity of 62.0 °API at 60° F., an IBP of 172° F., a 50% BP of 240° F., an EBP of 362° F., an F-1 clear octane number of 42.0, a paraffin content of 75 vol. percent, a naphthene content of 16 vol. percent, and an aromatic content of 9 vol. percent.

The catalyst utilized in the first part of the test is designated as Catalyst C and is prepared by the method given in Example VIII and found to contain 0.76 wt. percent chlorine, 0.11 wt. percent sulfur, and 0.76 wt. percent platinum combined with a carrier material containing gamma-alumina and 4.5 wt. percent mordenite.

The catalyst utilized for control purposes is designated as Catalyst D and is manufactured essentially by the method delineated in Example VIII except no mordenite is added to the alumina carrier material. Analysis shows it to contain 0.8 wt. percent chlorine, 0.10 wt. percent sulfur, and 0.75 wt. percent platinum combined with a substantially pure gamma-alumina carrier material.

Conditions utilized in both runs are a LHSV of 2.0 hr.$^{-1}$, a pressure of 600 p.s.i.g., a hydrogen to hydrocarbon mole ratio of 5:1, and a temperature sufficient to poduce a $C_5+$ reformate having an F-1 clear octane number of 95.0. Both tests are run to a catalyst life of about 8 barrels of charge per pound of catalyst.

Average yield data for these runs are present in Table III.

TABLE III.—RESULTS OF LONG TERM COMPARISON TEST

| | Catalyst C | Catalyst D |
|---|---|---|
| $H_2$ yield, s.c.f.b. | 200 | 350 |
| $C_1+C_2$, wt. percent | 8.3 | 8.9 |
| $C_3+C_4$, wt. percent | 27.5 | 16.3 |
| $C_5+$, wt. percent | 63.9 | 74.1 |

From these results, it is evident that the catalyst of the present invention (i.e. Catalyst C) produced LPG at a selectivity based on feed of 27.5 wt. percent which stands in sharp contrast to the 16.3 wt. percent selectivity observed for an ordinary reforming process at the same conditions. Moreover, Catalyst C exhibited an acceptable average temperature stability of about 4° F./BPP over the duration of the test.

I claim as my invention:

1. A catalyst composition comprising a halogen component on a solid support comprising an alumina matrix having suspended therein a finely divided crystalline aluminosilicate, said composition having been prepared by commingling the crystalline aluminosilicate in finely divided state with an aluminum hydroxyl halide sol, gelling the resultant mixture and then calcining the gelled mixture.

2. The composition of claim 1 wherein the sol is an aluminum hydroxyl chloride sol having a weight ratio of aluminum to chloride of about 1.0 to 1.4.

3. The composition of claim 1 wherein the crystalline aluminosilicate is mordenite.

4. The catalyst of claim 1 wherein the crystalline aluminosilicate comprises about 0.5 to about 20 wt. percent thereof.

5. The catalyst of claim 1 wherein the halogen component comprises about 0.01 to about 3 wt. percent thereof.

6. The catalyst of claim 1 wherein a Group VI or Group VIII metallic component is combined therewith after the calcination step to form a dual-function catalyst.

7. A hydrocarbon conversion catalyst comprising about 0.01 to about 3 wt. percent of a halogen component selected from fluorine and chlorine combined with a support containing alumina and finely divided crystalline aluminosilicate particles, said catalyst being prepared by uniformly distributing finely divided crystalline aluminosilicate particles throughout an aluminum hydroxyl halide sol to form a mixture thereof, gelling the resulting mixture to form substantially spherical hydrogel particles, and thereafter aging, washing, drying, and calcining the hydrogel particles to produce the catalyst.

8. The catalyst of claim 7 wherein said halogen component is chlorine, said crystalline aluminosilicate is in the hydrogen form, and said sol is an aluminum hydroxyl chloride sol.

9. The catalyst of claim 8 wherein the crystalline aluminosilicate is mordenite.

10. The catalyst of claim 9 wherein a Group VI or Group VIII metallic component is combined therewith after the calcination step to form a dual-function catalyst.

11. The catalyst of claim 10 wherein the Group VIII metallic component is platinum or a compound of platinum.

12. The catalyst of claim 11 wherein the mordenite comprises about 2.0 to about 10 wt. percent of the support.

13. The catalyst of claim 7 wherein a Group VI or Group VIII metal component is combined therewith after the calcination step to form a dual-function catalyst.

14. The catalyst of claim 13 wherein said metal component is palladium, present in an amount of from about 0.05% to about 1.5% by weight, and said crystalline aluminosilicate is mordenite.

15. The composition of claim 13 further characterized in that said metal component is nickel, palladium or platinum.

16. The composition of claim 15 further characterized in that said crystalline aluminosilicate is faujasite.

References Cited

UNITED STATES PATENTS

| | | | |
|---|---|---|---|
| 3,216,923 | 11/1965 | Haensel | 252—442 X |
| 3,250,728 | 5/1966 | Miale et al. | 252—455 |
| 3,296,119 | 1/1967 | Bicek et al. | 208—139 |
| 3,318,802 | 5/1967 | Martin | 252—455 X |
| 3,365,392 | 1/1968 | Mitsche et al. | 208—139 X |
| 3,369,997 | 2/1968 | Hayes et al. | 208—139 |

DANIEL E. WYMAN, Primary Examiner

C. F. DEES, Assistant Examiner

U.S. Cl. X.R.

208—139; 252—455; 260—683.15